Dec. 1, 1931.   F. H. JONES   1,834,456
CLUTCH
Filed Oct. 29, 1929   2 Sheets-Sheet 2

Inventor
Frank H. Jones,

Attorney

Patented Dec. 1, 1931

1,834,456

UNITED STATES PATENT OFFICE

FRANK H. JONES, OF UPPER SANDUSKY, OHIO

CLUTCH

Application filed October 29, 1929. Serial No. 403,261.

The object of the invention is to provide a clutch of the friction disk form which is particularly adapted to be mounted in a pocket or recess formed in the fly wheel of an auto vehicle engine, so that it may require but a minimum of space; to provide a clutch construction in which the friction ring is positively driven by means of lugs carried by the cover plate, the lugs having a substantial bearing surface with the friction ring without protruding, at any time, through the working face of the latter, so that the working face is without the usual slots with their attendant wear and tendency to abrade the friction members of the friction disk; to provide a clutch construction in which the pressure plate driving means are carried by the cover plate and act not only to center the latter on the fly wheel but to center and properly maintain the centering of the other driving elements of the clutch; to provide a clutch construction in which the release bearing is so constructed as to permit but a minimum of wear and provide an oil container for the relatively moving parts; and generally to provide a clutch construction which is reduced to the simplest mechanical form and is, therefore, susceptible of cheap manufacture and low marketing cost.

With this object in view the invention consists in a construction and combination of parts of which a preferred embodiment is illustrated in the accompanying drawings, wherein.

Figure 1:
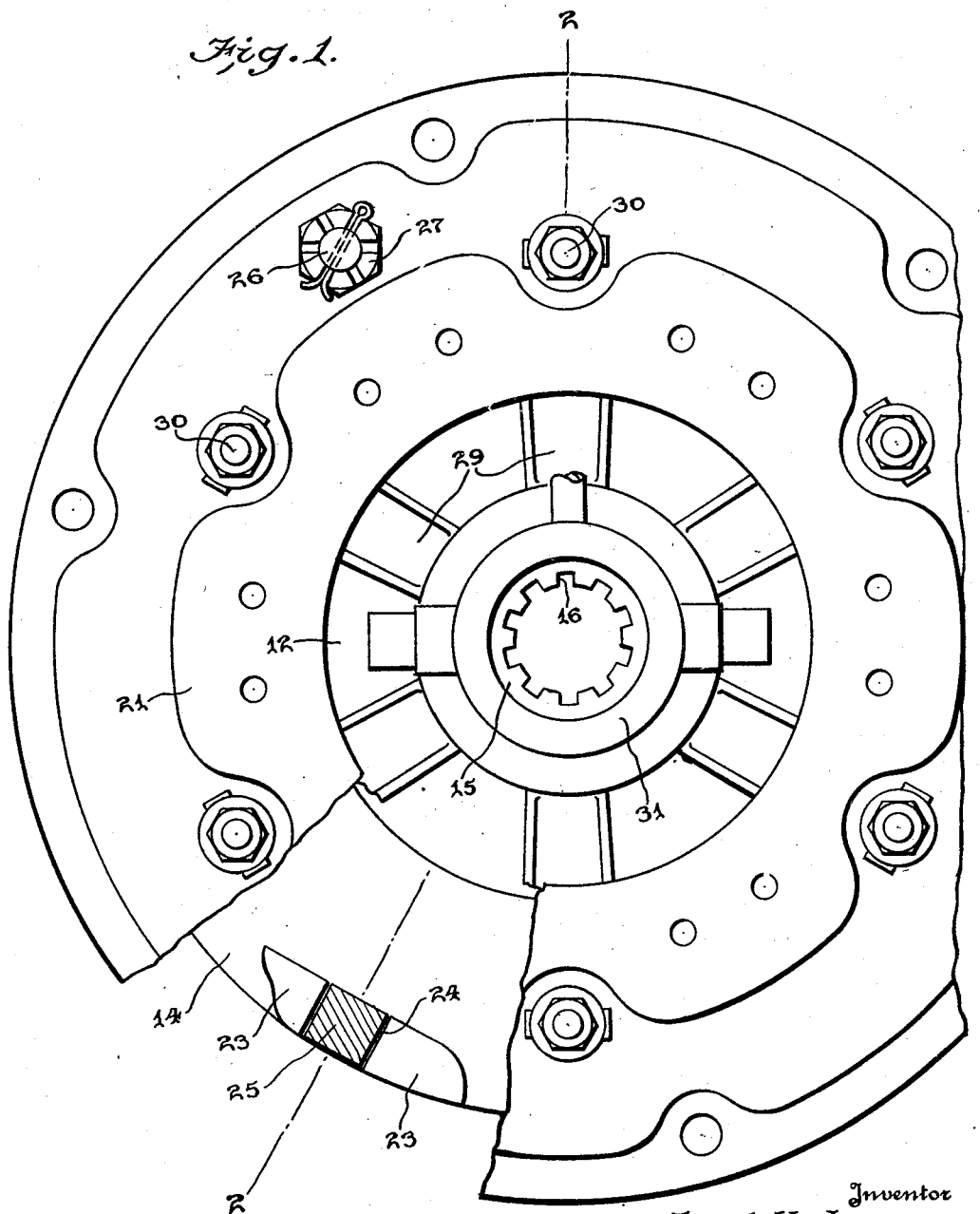
Figure 1 is a rear elevational view, partly broken away, showing a clutch constructed in accordance with the invention.
Figure 2:
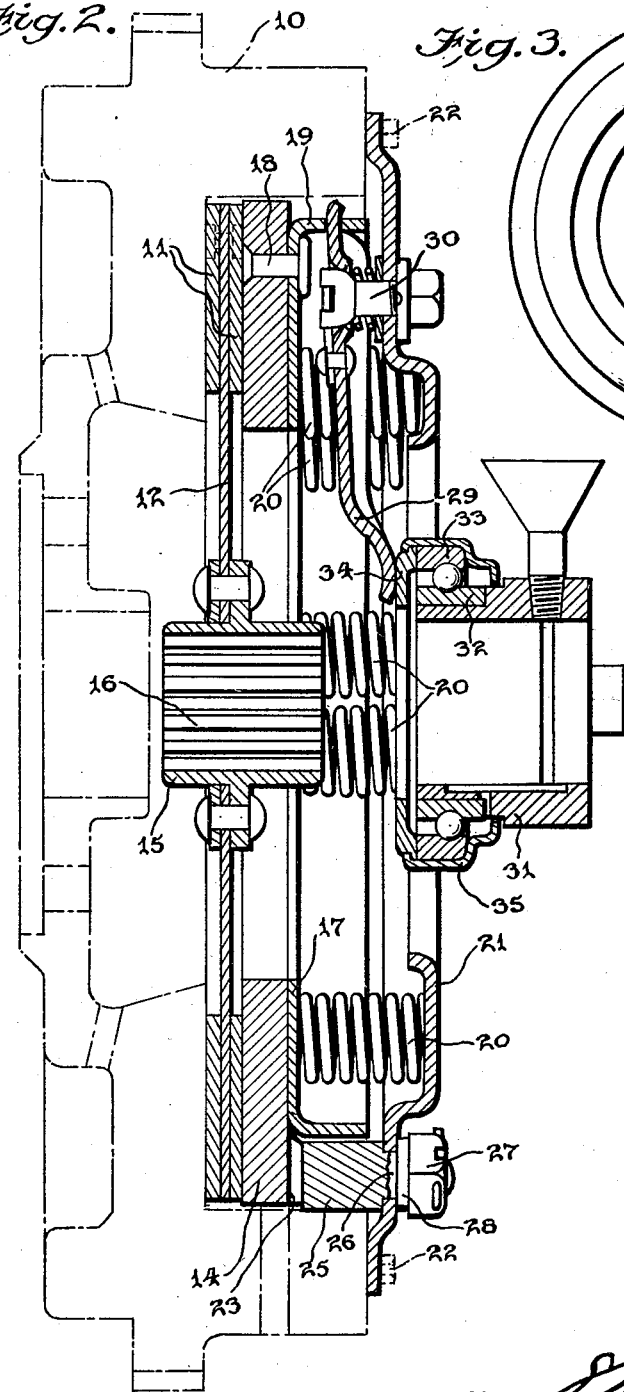
Figure 2 is a sectional view on the plane indicated by the line 2—2 of Figure 1, the engine fly wheel being indicated in dotted lines.
Figure 3:
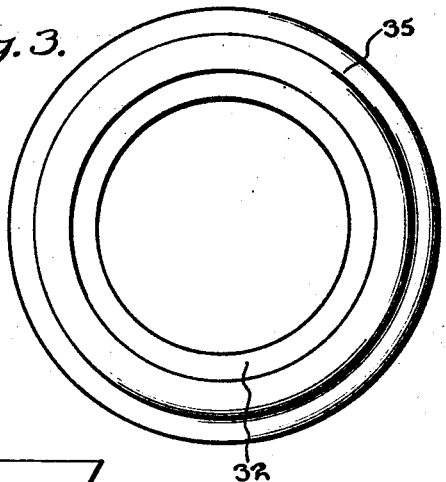
Figure 3 is an enlarged elevational view of the release bearing.
Figure 4:
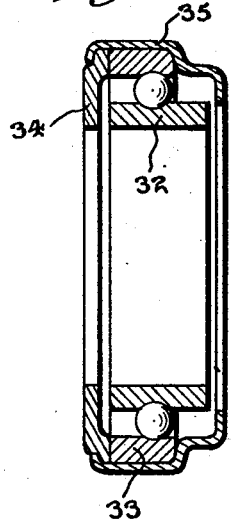
Figure 4 is a diametrical sectional view of said release bearing.

The clutch comprising the invention is designed to be mounted in the pocket of the engine fly wheel 10 and the friction rings 11 which are secured respectively to the front and rear faces of the friction disk 12 are engaged one with the rear face of the fly wheel at the bottom of the pocket and the other with the pressure plate 14. The friction disk 12 is carried by the hub 15 which is internally toothed as indicated at 16 to provide a connection with the driven shaft, so that the disk may move axially with reference to the shaft but be precluded from angular movement with reference thereto.

The pressure plate 14 on its rear face is provided with a release plate 17 which is preferably a steel stamping and secured to the pressure plate by means of rivets 18. It is customary to form the pressure plate 14 from cast iron and this being the case it is, therefore, likely to fracture under undue strains, but the provision of the lifter or release plate 17 from high grade steel makes the latter a reinforcing medium for the pressure plate, particularly by reason of the peripheral flange 19 with which the release plate is formed.

Pressure springs 20 are arranged in a circular series and bear one end against the release plate 17 and the other end against the cover plate 21 which is secured to the rear face of the fly wheel, as by cap screws 22.

It is essential that the pressure plate 14 be positively driven by the fly wheel and in order that this may be accomplished without forming slots through to the working face of the pressure plate, the latter on the rear face is formed with lugs 23, there being preferably three of these spaced 120° apart. These lugs 23 are formed with radial slots 24 in which are engaged driving posts 25, these latter being cross-sectionally angular and formed with threaded shanks 26 which extend through holes formed in the cover plate and receive castle nuts 27 which bear upon lock washers 28, the latter bearing upon the rear face of the cover plate. The driving posts 25 are so positioned that their outer faces engage the peripheral surface of the pocket formed in the fly wheel, so that these posts not only positively center the cover plate but also center the pressure plate with which they are slidably engaged by reason of the slots formed in the lugs 23. Since the cover plate is secured to the fly wheel and the driving posts 23 secured to the cover plate, positive angular or turning movement is imparted to the pressure plate from the fly wheel and yet the pressure plate may move toward or away from the friction members of the friction disk to engage or release the same.

The normal position of the pressure plate is that of engagement with its attendant friction member of the friction disk, because it is impelled towards the latter by the springs 20. It is withdrawn from such engagement, and the friction disk thereby released, by pressure applied upon the inner ends of the release levers 29 which are rockingly mounted on the fulcrum studs 30 carried by the cover plate and have their outer ends pivotally connected with the release plate 17 because of projecting through slots formed in the flange 19 of the latter.

Rocking movement is imparted to the release levers by axial movement given to a sleeve 31 which is designed for operative connection with a clutch pedal or the like. This sleeve 31 at the forward end carries the release bearing 32 which is of the general form of the conventional ball bearing but having the outer ring 33 provided with an annular plate 34 which constitutes a nose plate in contact with the inner ends of the release levers. A ring stamping 35 surrounds the release bearing, extending from the sleeve 31 over the outer ring 33 and onto the nose plate 34, being spun over the latter at the point where it contacts with the ring 33.

The nose plate 34 being in contact with the release levers and they turning by reason of being carried by the cover plate which rotates when the fly wheel is in motion, the nose plate will rotate freely by reason of the ball bearing connection between the elements of the bearing and the ring stamping will also rotate, the latter serving as an oil retainer to insure adequate lubrication of the bearing.

The invention having been described, what is claimed as new and useful is:

1. A clutch for mounting in a pocket formed in the fly wheel of an internal combustion engine, the same comprising a driven member embodying a friction disk, and a driving member comprising a pressure plate inclosed in said pocket, a cover plate for attachment to the rear face of the fly wheel, and spaced posts mounted in said cover plate and bearing on the inner periphery of said pocket, said posts constituting the only centering means for the cover plate and having sliding interlocking connections with said pressure plate.

2. A clutch for mounting in a pocket formed in the fly wheel of an internal combustion engine, the same comprising a driven member embodying a friction disk, and a driving member comprising a pressure plate inclosed in said pocket, a cover plate for attachment to the rear face of the fly wheel, and spaced posts mounted in said cover plate to bear on the inner periphery of said pocket and constitute the only centering means for the cover plate, said pressure plate on that face opposite the friction disk having lugs formed with radial slots with which said posts slidably engage.

In testimony whereof he affixes his signature.

FRANK H. JONES.